2,752,388

CATALYTIC MONO-ACYLATION OF HEXYL-RESORCINOL AND ITS KETO-ANALOG

Joseph Sylvester Dereska, Copley, Ohio, assignor to Strong, Cobb and Company, Inc., Cleveland, Ohio, a corporation of Delaware No Drawing. Application August 28, 1952,
Serial No. 306,954

5 Claims. (Cl. 260—479)

The present invention relates to catalytic methods for producing acyl esters of hexylresorcinol and other alkyl and alkanoylresorcinols and, more particularly, to the production from hexylresorcinol by catalytic procedures of hexylresorcinol mono- and di-acyl esters, with especial reference to the catalytic production of the crystalline isomer of hexylresorcinol mono-acetate.

Procedure for the production of acyl esters of hexylresorcinol such as hexylresorcinol mono-acetate and other mono-acyl esters in particular has been developed by reacting the hexylresorcinol or other alkylresorcinol with an acyl halide, the non-anionic portion of which contains the desired ester group. While these esters can also be produced by the use of the appropriate acyl anhydride without a catalyst, the products (esters) so produced are substantially entirely in the form of the oil isomers with extremely small, if any, production of the crystalline isomers. This is particularly true in the case of hexylresorcinol monoacetate which, when prepared by the reaction of hexylresorcinol and acetic anhydride without a catalyst, produces very little of the crystalline isomer of hexylresorcinol mono-acetate, the product being therefore predominantly the oil isomer. While both the oil isomer and the crystalline isomer have satisfactory anthelmintic properties, the crystalline isomer has many advantages in use over the oil isomer but, heretofore, it has not been possible, in a relatively easy simple manner, to produce satisfactory yields of such crystalline isomer. Procedure involving the use of acyl halides is further subject to certain disadvantages with regard to cost and efficiency and the necessity of using stoichiometric quantities of reactants and, therefore, the art has needed a process which would give better and more effective results without dependence upon the use of acyl halides.

It is, therefore, an object of the present invention to provide a procedure not dependent upon the use of acyl halides and which is highly effective and efficient in the conversion of hexylresorcinol and other alkylresorcinols and their keto-analogs to their corresponding mono- and di-acyl esters.

Another object of the invention is to carry out the esterification of hexylresorcinol and other alkylresorcinols and their keto-analogs by reacting such resorcinols with the anhydride of the ester group in the presence of a trace amount of a catalyst, thereby making it possible to effect esterification efficiently and simply and to produce large yields of the crystalline isomers of those esters having crystalline isomers and, in general, to improve markedly the conversion of the alkylresorcinols to their mono- or di-acyl esters.

A further object of the invention resides more particularly in the effective catalytic acylation of hexylresorcinol to its hexylresorcinol mono-acetate crystalline isomer.

A still further object of the invention resides in the utilization, for the catalytic acylation of hexylresorcinol and other alkylresorcinols and their keto-analogs, of certain hereinafter specified catalysts which need only be present in trace amounts by reacting such resorcinols in the presence of any of such catalysts with the anhydride of the desired esterifying group and a suitable solvent.

Other and still further objects and advantages will be understood by those skilled in this art or will be apparent or pointed out hereinafter.

The present invention is predicated upon the important discovery that the acylation of hexylresorcinol and other alkylresorcinols and their keto-analogs wherein the alkyl group, for example, contains from 1 to 7 carbon atoms (methyl-heptyl) can be surprisingly and unexpectedly carried out with great ease and efficiency by reacting the hexylresorcinol or other alkyl resorcinol with the anhydride of the esterifying group in the presence of only a trace amount of a catalyst and that, referring particularly to hexylresorcinol mono-acetate, an unusually effective esterification of hexylresoncinol can be carried out by reaction with acetic anhydride in the presence of a trace amount of catalyst and in the presence of a suitable hydrocarbon solvent, whereby efficient production of the crystalline isomer of hexylresorcinol mono-acetate can be obtained.

In addition to hexylresorcinol, it has been discovered that the present procedure is also exceptionally effective for other alkylresorcinols, such as ethyl, propyl, butyl and for hexanoyl (caproyl) resorcinol. The appropriate anhydride of the esterifying group is employed in each instance. The catalyst which has been found to be effective in the present invention is selected from the group consisting of sulfuric acid (concentrated), gaseous hydrogen chloride, gaseous hydrogen bromide, gaseous hydrogen iodide or its aqueous solution, gaseous hydrogen fluoride, acetyl chloride as a catalyst only and not as the esterifying reactant, mercuric chloride, boron trifluoride and aluminum trichloride. The foregoing catalysts when used in trace amounts have been found to be effective and satisfactory for the production of acyl ester isomers of hexylresorcinol and other alkylresorcinols but the following catalysts are also useful for the catalytic esterification of alkylresorcinols where the production of oil isomers is acceptable or desired—viz., antimony trifluoride, ammonium chloride, zinc chloride, boric acid ($H_2BO_3$) and pyridine.

The invention is illustrated by, but not limited to, the following examples:

Example 1

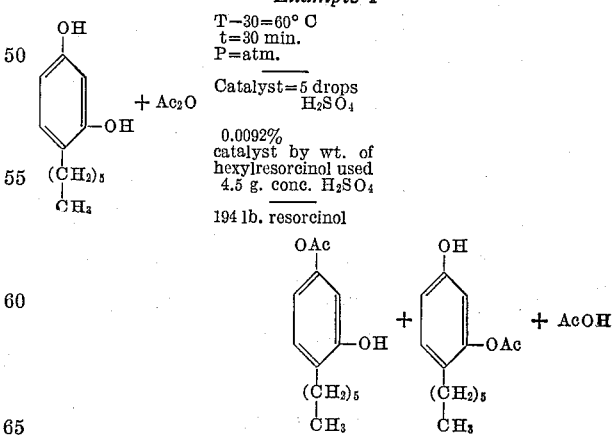

In accordance with the foregoing reaction, 10 gram mols (1942.6 grams) of hexylresorcinol, 10 gram mols (1020.9 grams) of acetic anhydride (technical grade), and 4 liters (2720 grams) of heptane as a solvent were placed in an open 3 gallon enameled pot. After stirring for 5 minutes to obtain partial solution, 5 drops (0.145 gram) of concentrated C. P. sulphuric acid were added slowly with stirring. This amount of sulphuric acid corresponds to 1.2 oz. of sulfuric acid per 1000 pounds of hexylresorcinol used. During the reaction the color changed to orange-red, deepening slowly to red, and accompanied by the formation of a clear, one-phase solution. The pot was covered and allowed to stand during which time the temperature slowly rose to about 50° C. and after 3 hours dropped back to room temperature, whereupon the pot and its contents were allowed to stand undisturbed overnight. After washing several times with water, the solution was cooled to 5–10° C. and the crystals filtered. The yield of crystalline isomer ranges from 40–60%. The oil isomer was formed in 40–50% yields. The crystals were air dried and had a melting point of 63.5–64° C.

*Example II*

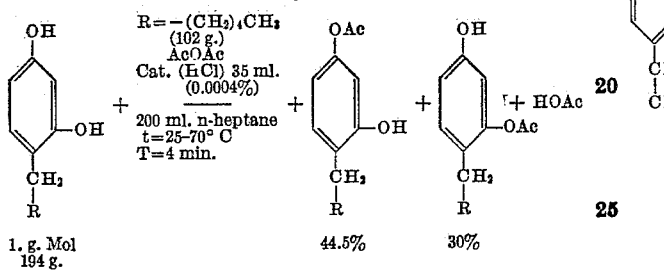

Trace amounts of hydrogen chloride gas were added as a catalyst at room temperature to a mixture in n-heptane of equivalent quantities of acetic anhydride and hexylresorcinal as noted in the reaction above. Reaction occurred almost immediately manifested by a red color change and a rise in temperature. After allowing the mixture to stand overnight, crystals were found in the flask in which the reaction was carried out and these crystals, upon agitation, increased in amount until the reaction product solidified. The contents of the flask were warmed on a steam bath to produce a solution and the solution was washed with two equal volumes of water followed by a wash with a 5% solution of sodium bicarbonate and then two more equal volume water washes. Upon cooling the solution by means of ice water, it solidified to a mass of crystals. These were washed with n-heptane until the yellow oil isomer was washed out and the crystals were water white. Calculated for $C_{14}H_{20}O_3$: C, 71.16; H, 8.53. Found: C, 71.20; H, 8.48. The dried crystal needles had a melting point of 63.5–64.0° C. Ferric chloride gave a yellow-green test reaction indicating absence of carbonyl group. Boiling a 1 gram sample in aqueous sodium hydroxide for 30 minutes gave on back titration a saponification equivalent of 230 compared with a theoretical molecular weight of 236. After saponification the products were identified as hexylresorcinol and sodium acetate, thus proving the presence of the original acetate ester. The oil isomer was also formed in this process and it gave a red-blue color with ferric chloride. The yield of crystalline isomer in the above reaction was 44.5% and that of the oil isomer 30% but other runs produced conversions of 60% of crystal isomer based upon the hexylresorcinol. The mono-acetate oil was readily hydrolyzed back to hexylresorcinol for reuse. Thus, in a 2-pass process about 70% yield of the crystalline isomer is obtainable.

*Example III*

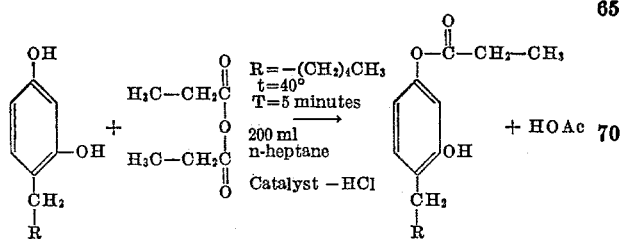

1.0 gram mol of hexylresorcinol and 1.0 gram mol of propionic anhydride were mixed in 200 ml. of n-heptane. Dry hydrochloric acid gas from a small generator was passed in and the temperature rose from 26 to 40° C. and a one-phase solution resulted in about 5 minutes. After standing 30 minutes, the product was dissolved in ether, washed with water and bicarbonate of soda solution to remove propionic acid and was then dried and distilled. A colorless oil boiling at 186–188° C. at 1.8 mm. of mercury was obtained in 6 fractions. About 55% total conversion was effected, based upon the hexylresorcinol.

*Example IV*

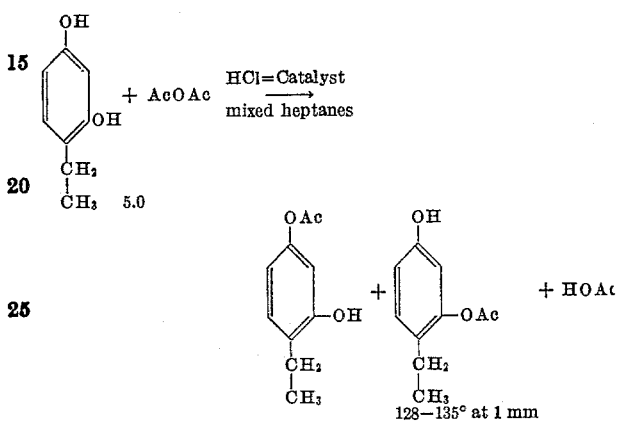

The foregoing reaction illustrates a catalytic process for the production of resorcinol derivative esters and those specifically prepared by the procedure were ethylresorcinol mono-acetate, propylresorcinal mono-acetate, hexylresorcinol mono-acetate, heptylresorcinol mono-acetate, and hexanoylresorcinol mono-acetate (caproylresorcinol). While the reaction was primarily employed to prepare the mono-acetate esters, it can also be utilized for the preparation of the corresponding di-acetates.

In the specific reaction illustrated above which is typical, a 5 gram sample of ethylresorcinol was mixed with an equivalent amount of acetic anhydride in 50 ml. Skelly B hydrocarbon solvent. Hydrochloric acid gas as a catalyst was bubbled through the solution for 5 minutes. After 24 hours the product was washed as in previous examples, dried and distilled. The product produced boiled at 128–135° C. at 1 mm. mercury pressure. The refractive index at room temperature was 1.5260 and the weight of the distillate was 2.25 grams.

*Example V*

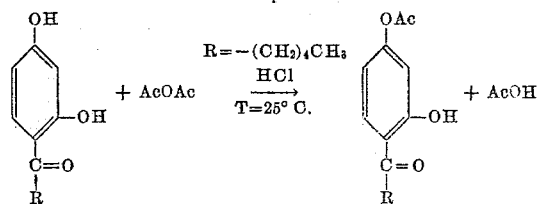

The literature reports only an oil isomer from a procedure using acetyl chloride in quantitative amounts on hexanoylresorcinol (caproylresorcinol). By employing hydrochloric acid gas for the catalytic acylation in accordance with the present invention, not only was a greater conversion obtained but it was possible to produce a solid crystal product having a melting point of 32.5–33.5° C., which had good anthelmintic properties. Crystalline hexanoylresorcinol mono-acetate is, therefore, a new product produced for the first time. In accordance with the above reaction, a 0.1 gram mol sample of hexanoylresorcinol was mixed with 0.1 gram mol of acetic anhydride in 5.0 ml. Skellysolve C. Dry hydrochloric acid gas as a catalyst caused reaction within 10 minutes and after 24 hours the reaction product was washed 3 times with equal volumes of water and then distilled under vacuum. The distillate upon refrigeration yielded 9.5 grams of crystalline material having a melting point of 32.5–33.5° C. The invention is also applicable to other keto-analogs of alkylresorcinols.

It will, therefore, be appreciated that, in accordance with the invention, esters of alkylresorcinols and hexanoylresorcinol and especially crystalline mono-esters of hexylresorcinol and hexanoylresorcinol may be effectively prepared by my new catalytic acylation procedure. Nor is the invention limited to acetate esters since the propionate and butyrate esters may also be produced. It will further be apparent that in most cases nearly quantitative yields result. Catalytic acylation procedures are carried out within the temperature range of 25–70° C. but some variation from this temperature range is permissible without loss of the benefits of the invention. In general, however, it is desired to maintain the temperatures at the lower part of this temperature range because the higher temperatures favor the formation of oil isomers, whereas the lower temperatures favor the formation of crystalline isomers. This substantial temperature range also has the advantage that in commercial production close temperature control is not required. The reactions are carried out at atmospheric pressure and, while stirring and agitating are mentioned, these are not absolutely essential. Only a small amount of catalyst is required to bring about reaction and the reaction can be easily held under control by slow addition of the catalyst in small increments. Open containers can generally be employed without disadvantage and are even suitable for larger volume runs in preparing hexylresorcinol mono-acetate. The nature and effect of the solvents, however, have been found to be of critical significance. For example, nitrobenzene was a poor solvent medium as were 1,4 dioxane, alcohol and ether. Benzene was somewhat better but solubility of the product was found to be greater. Hydrocarbon solvents were found to be the best and aliphatic hydrocarbon solvents are preferred; n-heptane, mixed heptanes, Skelly B, C, D and H were all used effectively in carrying out the reactions. These are all hydrocarbon solvents of the heptane type.

The foregoing is intended as illustrative and not as limitative since within the terms of the appended claims other and still further variations may be employed without departing from the invention.

I claim:

1. A catalytic process for preparing the crystalline ester isomer of a $C_6$ alkyl- and alkanoylresorcinol which comprises reacting one of said resorcinols at a temperature of about 25–70° C. with acetic anhydride, in the presence of a trace of a catalyst selected from the group consisting of concentrated sulfuric acid, gaseous hydrogen chloride, gaseous hydrogen bromide, gaseous hydrogen iodide, aqueous hydrogen iodide, hydrogen fluoride, acetyl chloride, mercuric chloride, boron fluoride and aluminum chloride and in a heptane solvent, recovering the oil and crystalline ester isomers so produced and isolating the crystalline isomer.

2. A catalytic process according to claim 1, wherein the oil isomer is saponified and then re-processed in the same manner to produce an additional quantity of crystalline ester isomer to constitute a 2-pass process.

3. A catalytic process for the preparation of crystalline hexylresorcinol mono-acetate which comprises the steps of reacting equi-molecular quantities of hexylresorcinol and acetic anhydride in a heptane solvent and in the presence of a trace of concentrated sulfuric acid as a catalyst, recovering the oil and crystal isomers of hexylresorcinol mono-acetate thus formed, isolating the crystal isomer and re-processing the oil isomer in the same manner to produce an additional quantity of the crystal isomer.

4. A catalytic process for the preparation of crystalline hexylresorcinol mono-acetate which comprises the steps of reacting equi-molecular quantities of hexylresorcinol and acetic anhydride in n-heptane as a solvent and in the presence of a trace of concentrated sulfuric acid as a catalyst, recovering the oil and crystal isomers of hexylresorcinol mono-acetate thus formed, isolating the crystal isomer and re-processing the oil isomer in the same manner to produce an additional quantity of the crystal isomer.

5. A process for preparing crystalline hexanoylresorcinol mono-acetate, which comprises the steps of reacting equivalent quantities of hexanoylresorcinol with acetic anhydride in a heptane solvent and in the presence of a trace of gaseous hydrogen chloride as a catalyst and recovering crystalline hexanoylresorcinol mono-acetate from the reaction products thus produced.

References Cited in the file of this patent

UNITED STATES PATENTS 2,442,089    Lieber _____ May 25, 1948

OTHER REFERENCES

Twiss: "Jour. Am. Chem. Soc.," vol. 48 (1926), pgs. 2206–2212.

Baker et al.: J. Chem. Soc. London (1936), p. 280.

Siebenmann et al.: J. Am. Chem. Soc. 65 (1934), pg. 2128.

Groggins: "Unit Process in Org. Synthesis," 3d ed., (1947), pgs. 614–617, 624–627.